(12) United States Patent
Huggler et al.

(10) Patent No.: US 9,121,421 B2
(45) Date of Patent: Sep. 1, 2015

(54) INTERFACE AND SUPPORT MECHANISM (75) Inventors: Dietmar Huggler, München (DE); Thomas Pfitzmaier, Ustersbach (DE)

(73) Assignee: ELEKTA AB (PUBL), Stockholm (SE)

( * ) Notice: Subject to any disclaimer, the term of this patent is extended or adjusted under 35 U.S.C. 154(b) by 104 days.

(21) Appl. No.: 13/303,595

(22) Filed: Nov. 23, 2011

(65) Prior Publication Data
US 2013/0129416 A1 May 23, 2013

(51) Int. Cl.
F16B 21/18 (2006.01)
F16B 5/00 (2006.01)
F16B 5/06 (2006.01)
A61G 13/12 (2006.01)

(52) U.S. Cl.
CPC ............ F16B 5/0016 (2013.01); A61G 13/128 (2013.01); A61G 13/129 (2013.01); F16B 5/0628 (2013.01); Y10T 403/7045 (2015.01); Y10T 403/7073 (2015.01)

(58) Field of Classification Search
CPC .... F16B 5/0004; F16B 5/0008; F16B 5/0012; F16B 5/0016; F16B 5/0628; F16B 12/10; F16B 12/125; F16B 12/34; F16B 12/56
USPC ............. 403/70, 71, 345, 363, 364, 121, 375; 5/182, 183, 649, 661, 181, 185, 351, 5/624, 184, 648; 384/38, 42
See application file for complete search history.

(56) References Cited

U.S. PATENT DOCUMENTS

| | | | |
|---|---|---|---|
| 2,282,932 A * | 5/1942 | Burnett | 81/25 |
| 2,872,259 A | 2/1959 | Thorpe | |
| 3,428,307 A | 2/1969 | Hunter et al. | |
| 4,016,689 A * | 4/1977 | Wendt | 52/145 |
| 4,068,961 A * | 1/1978 | Ebner et al. | 403/55 |
| 4,212,454 A | 7/1980 | Lee | |
| 4,294,460 A * | 10/1981 | Kirsch | 280/607 |
| 4,320,549 A * | 3/1982 | Greb | 14/73.5 |
| 4,575,064 A | 3/1986 | Menor | |
| 5,138,954 A * | 8/1992 | Mulcahy | 105/199.3 |
| 5,157,800 A * | 10/1992 | Borders | 5/602 |
| 5,222,902 A * | 6/1993 | Piersch | 446/121 |
| 5,419,657 A * | 5/1995 | Davis | 405/209 |
| 5,537,454 A | 7/1996 | Korver, II | |
| 5,597,239 A * | 1/1997 | Scaramuzza et al. | 384/36 |
| 5,641,102 A * | 6/1997 | Hellweg | 224/198 |
| 5,913,781 A * | 6/1999 | Vidmar et al. | 52/102 |
| 6,085,668 A * | 7/2000 | Kanki | 108/65 |
| 6,126,136 A * | 10/2000 | Yen et al. | 248/560 |
| 6,289,537 B1 * | 9/2001 | Hopper et al. | 5/624 |
| 6,408,464 B1 * | 6/2002 | Weismiller et al. | 5/602 |
| 6,467,961 B2 * | 10/2002 | Nakamaru et al. | 384/13 |

(Continued)

FOREIGN PATENT DOCUMENTS

JP 02930829 B2 8/1999

Primary Examiner — Daniel P Stodola
Assistant Examiner — Matthew R McMahon
(74) Attorney, Agent, or Firm — Finnegan, Henderson, Farabow, Garrett & Dunner, LLP (57) ABSTRACT

An interface for releasably coupling an extension and a support includes a plurality of tenons extending beyond respective mating edges of the support and the extension to form at least one slot between the tenons and a plurality of bearings to react to loading of the extension. Each bearing has at least one degree of freedom. The one degree of freedom may be a rotational degree of freedom.

13 Claims, 12 Drawing Sheets

(56) References Cited

U.S. PATENT DOCUMENTS

| | | |
|---|---|---|
| 6,598,275 B1 | 7/2003 | Kolody et al. |
| 6,675,415 B2 | 1/2004 | Wong |
| 6,729,589 B2 * | 5/2004 | Shelef ........................ 248/181.1 |
| 6,752,065 B2 * | 6/2004 | Sugioka et al. ................ 92/12.2 |
| 6,895,617 B2 | 5/2005 | Zacharopoulos et al. |
| 6,904,630 B2 | 6/2005 | Al-Kassim et al. |
| 6,929,418 B2 * | 8/2005 | McDevitt ...................... 403/364 |
| 6,941,599 B2 | 9/2005 | Zacharopoulos et al. |
| 7,076,821 B2 | 7/2006 | de Mooy |
| 7,210,180 B2 * | 5/2007 | Malcolm ........................... 5/658 |
| 7,373,676 B2 * | 5/2008 | Markovic et al. .................. 5/601 |
| 7,547,142 B2 * | 6/2009 | Robinson et al. ............... 384/36 |
| 8,484,911 B2 * | 7/2013 | Zayas et al. .................. 52/167.5 |
| 2007/0131826 A1 * | 6/2007 | Valkai ........................ 248/188.4 |
| 2007/0214570 A1 | 9/2007 | Coppens et al. |
| 2007/0223993 A1 * | 9/2007 | Peterson et al. .............. 403/364 |
| 2008/0066231 A1 | 3/2008 | Coppens |
| 2010/0330227 A1 * | 12/2010 | Godde .......................... 425/589 |

* cited by examiner

INTERFACE AND SUPPORT MECHANISM

FIELD OF THE INVENTION

The present invention relates generally to an interface for coupling modules to each other, and, more specifically, to a load distributing interface for coupling a modular extension to a support.

BACKGROUND OF THE INVENTION

Attaching different extension modules to an end of a patient support is desirable for performing different types of treatments. However, it is expensive and difficult to machine the interfaces of the extension modules and the patient support to sufficiently high tolerances to reduce the movement between the two pieces.

Often, the faces of the support and extension are relied upon to provide the points of contact between the two components. Trying to control these faces to sufficiently high tolerances can be a costly and time consuming process. In some situations, it may not be feasible to machine such a large surface within a specific tolerance. These surfaces may contain high points in certain areas which would serve as the points of contact, potentially creating a dangerous uneven loading condition that could lead to catastrophic failure when a patient is on the extension. Other extension systems in the prior art rely upon more complicated mechanisms or tightly toleranced interfaces, such as snap connections and closely machined rods and sockets.

Accordingly, there exists a need in the art for a reliable, cost-effective interface that allows for an extension to be added to a support with minimal effort and reasonable tolerances. There is also a need for an interface that helps ensure even loading across multiple contact points when an extension is added to a support.

SUMMARY OF THE INVENTION

The present invention addresses the issues in the prior art by using bearings that allow the upper and lower bearing surfaces to lie at different angles while still providing a structure through which large forces can be transferred. Further, by limiting contact between the extension and the support to the bearings, and by using self-leveling bearings, a much lower tolerance is required to effectively couple the support and the extension. This reduces the costs and time of manufacture, and can also reduce the risk that a component falls out of an acceptable tolerance range through inadvertent damage. Installation and removal may be easily accomplished without the need for additional tools.

According to one aspect, the invention relates to an interface for releasably coupling an extension and a support. The interface includes a plurality of tenons extending beyond respective mating edges of the support and the extension to form at least one slot between the tenons and a plurality of bearings to react loading of the extension. Each bearing has at least one degree of freedom. The one degree of freedom may be a rotational degree of freedom.

In some embodiments, the support has at least two tenons forming the slot therebetween and the extension has at least one tenon for receipt in the slot. The two tenons on the support may be disposed proximate opposite edges of the support and each tenon may have one of the bearings. In other embodiments, at least one bearing is disposed on a lower surface of the support proximate the slot. In still other embodiments, the bearings are disposed on the support. The bearings may have at least two degrees of freedom and may be self-leveling surfaces. The interface may have four bearings.

In additional embodiments, the interface includes a plurality of load plates aligned with the plurality of bearings when the support and the extension are coupled. The load plates may be located on the extension, and all the load plates may be on the extension. In some embodiments, the support may be aluminum and the extension may be carbon fiber. The interface may also include a latch for securing the extension and the support, at least one biasing member for displacing the extension relative to the support, and/or a visual indicator of proper coupling of the support and the extension.

In another aspect, the invention relates to a method for releasably coupling an extension and a support. The method includes providing a plurality of tenons extending beyond respective mating edges of the support and the extension, where the plurality of tenons form at least one slot between them. The method also includes providing a plurality of bearings each having at least one degree of freedom to react loading of the extension, aligning at least one tenon with the slot, and coupling the extension and the support. The one degree of freedom may be a rotational degree of freedom.

In some embodiments, the support includes at least two tenons forming the slot therebetween and the extension includes at least one tenon for receipt in the slot. The two tenons on the support may be disposed proximate opposite edges of the support, and each tenon may have one of the bearings. In other embodiments, the at least one bearing is disposed on a lower surface of the support proximate the slot. All of the bearings may be disposed on the support, may have at least two degrees of freedom, and/or may have self-leveling surfaces. The interface may have four bearings.

In additional embodiments, the method includes aligning a plurality of load plates with the plurality of bearings when the support and the extension are coupled. The load plates may be disposed on the extension. The support may be aluminum and the extension may be carbon fiber. In other embodiments, the method includes securing the extension to the support, displacing the extension relative to the support, and/or indicating proper coupling of the support and the extension.

BRIEF DESCRIPTION OF THE FIGURES

Other features and advantages of the present invention, as well as the invention itself, can be more fully understood from the following description of the various embodiments, when read together with the accompanying drawings, in which.

DETAILED DESCRIPTION OF THE INVENTION

The invention may be better understood by reference to the following detailed description, taken in conjunction with the drawings. For the sake of simplicity, one embodiment of the invention is described below in relation to a support and extension for a radiotherapy patient support. Other configurations and variants will be apparent to those skilled in the art from the teachings herein.

Figure 1:
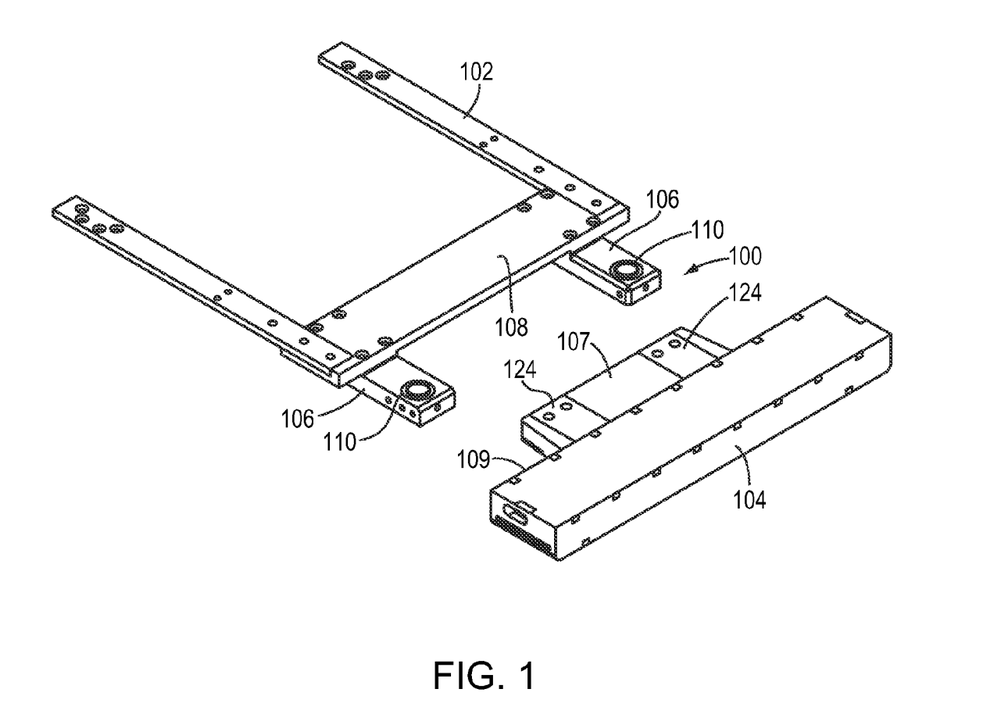
FIG. 1 is a schematic top perspective view of interfacing elements of a support and an extension in an uncoupled position in accordance with one embodiment of the invention.

FIG. 1 depicts an interface 100 between a support module 102 and an extension module 104. The support 102 has two support tenons 106 (or prongs) proximate opposite edges of the support 102 that extend beyond a support mating edge 108 where the support 102 contacts the extension 104. The support 102 may contact the extension 104 along multiple edges. The support tenons 106 may extend beyond the support mating edge 108 by approximately 70 mm, and may be as little as 50 mm or less, and as much as 90 mm and more. The support 102 may have any number of support tenons 106, including as few as one and as many as three, or four, or even more. The support tenons 106 may be disposed in a number of positions, such as proximate a midpoint of a side of the support 102, at opposite ends, or at locations in between. When the support 102 has multiple support tenons 106, as in FIG. 1, adjacent support tenons 106 define a slot therebetween. The slot may be configured to receive a corresponding extension tenon 107, as discussed in greater detail below. The support tenons 106 may also be disposed below a top surface of the support 102. This can help allow the top surface of the support 102 to be substantially continuous with a top surface of the extension 104. The support 102 may be made of a number of materials, including, but not limited to, metals (e.g., steel, aluminum, iron), plastics, and others, such as carbon fiber. Because the support 102 may be relatively stationary for long periods of time, lightweight materials may not be required.

Figure 2A:
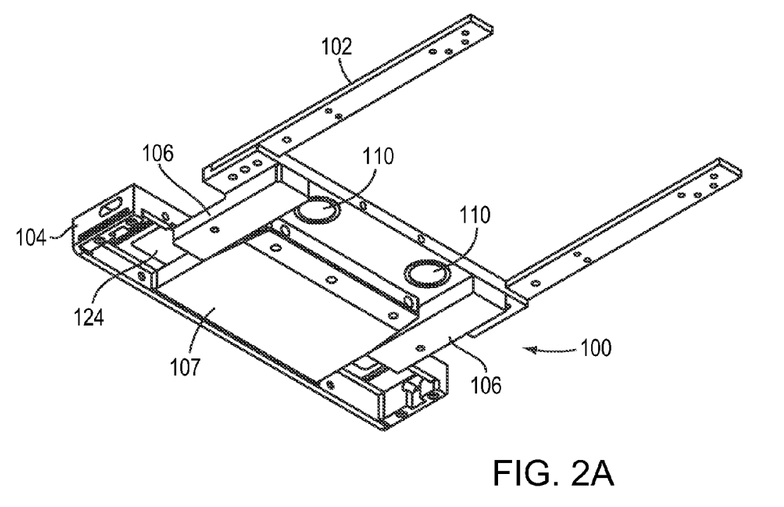
FIGS. 2A and 2B are schematic perspective bottom and top views, respectively, of the support and the extension of FIG. 1 in a partially coupled position in accordance with one embodiment of the invention.
Figure 3A:
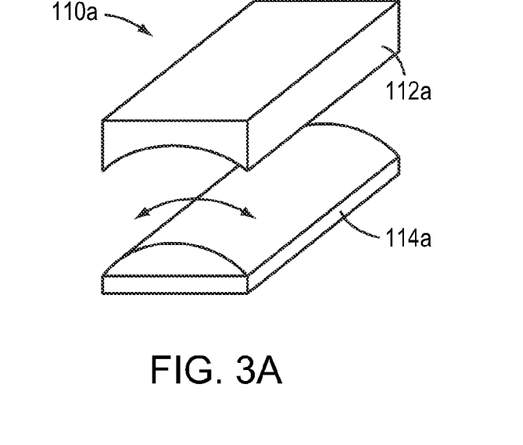
FIG. 3A is a schematic perspective view of a cylindrical bearing for use in accordance with one embodiment of the invention.
Figure 3B:
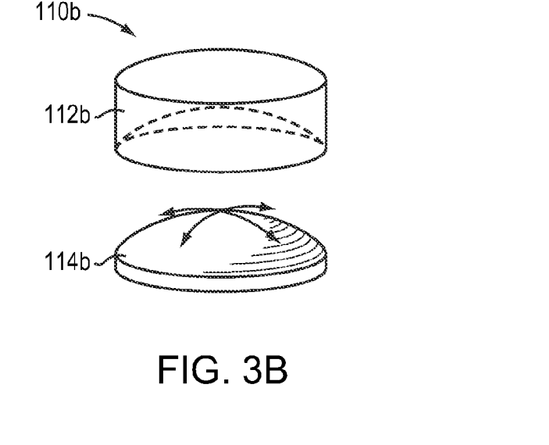
FIG. 3B is a schematic perspective view of a spherical bearing for use in accordance with one embodiment of the invention.

The support 102 may contain a plurality of bearings 110. Two bearings 110 are visible in FIG. 1 on upper surfaces of the support tenons 106, while another two bearings 110 are disposed on an underside of the support 102, as depicted in FIG. 2A, for a total of four bearings 110. Any number of bearings 110 may be used, such as one, two, three, or more than four. Using at least three bearings 110 may help fix the extension 104 in a plane relative to the support 102. The bearings 110 may be configured to handle large forces, especially from normal and shear loads. Exemplary bearings are illustrated in FIGS. 3A and 3B. A cylindrical bearing 110a, depicted in FIG. 3A, allows for one degree of freedom. An upper cylindrical concave element 112a may have a substantially planar upper surface and a cylindrically concave lower surface, while a lower cylindrical convex element 114a may have a substantially planar lower surface and a cylindrically convex upper surface corresponding to the upper cylindrical concave element 112a. This configuration allows the upper concave 112a and lower convex 114a cylindrical elements to rotate in two-directions (a rotational degree of freedom), as indicated by the arrows in FIG. 3A, but not longitudinally. The relatively large contact surface between the upper concave 112a and lower convex 114a cylindrical elements help allow the entire cylindrical bearing 110a to react relatively large forces without failure, especially large forces normal to an upper surface of the upper cylindrical concave element 112a, regardless of the rotational position of the upper cylindrical concave element 112a relative to the lower cylindrical convex element 114a. A spherical bearing 110b is depicted in FIG. 3B. The spherical bearing 110b is substantially similar to the cylindrical bearing 110a, except the concave and convex surfaces are spherical as opposed to cylindrical. The spherical surfaces allow for 360° of rotational movement about the center of the sphere defined by the surfaces (two degrees of freedom), partially illustrated by the arrows in FIG. 3B, and may also allow for rotation of an upper spherical concave element 112b about its axis. The spherical configuration also helps the upper spherical concave element 112b self-level as it is free to move in all directions along the surface of the lower spherical convex element 114b to reach an equilibrium.

Figure 4A:
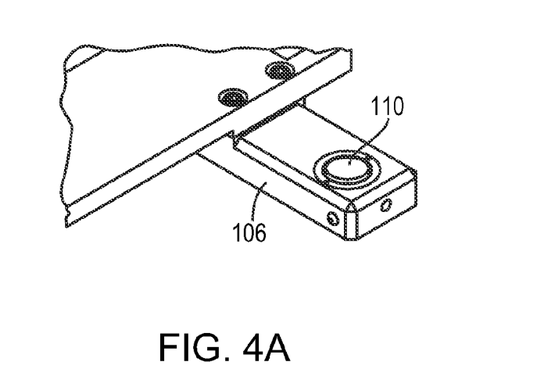
FIG. 4A is an enlarged schematic perspective view of a tenon and a bearing on the support of FIG. 1 in accordance with one embodiment of the invention.
Figure 4B:
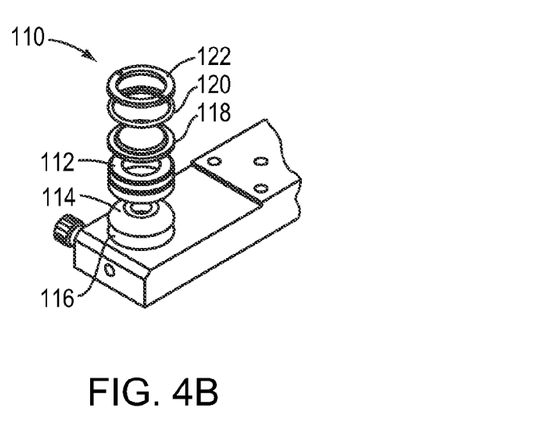
FIG. 4B is an enlarged exploded perspective view of the bearing of FIG. 4A in accordance with one embodiment of the invention.

As depicted in an enlarged view in FIG. 4A, an upper surface of the bearing assembly 110 extends beyond an upper surface of the support tenon 106 by approximately 0.5 mm, and may be as little or less than 0.2 mm or as much and greater than 1 mm. The complete bearing assembly 110 may be disposed in a recess 116, as shown in FIG. 4B. The bearing assembly 110 may include a lower convex element 114, an upper concave element 112, a seal 118, a seal retainer 120, and a bearing retainer 122. The lower convex element 114 is disposed in the bottom of the recess 116, and may be disposed on a spacer or otherwise elevated to calibrate the location of the upper surface of the bearing assembly (as defined by an upper surface of the seal 118). The upper concave element 112 is located on top of the lower convex element 114, and is free to move in any direction relative to the lower convex element 114 when both the upper concave element 112 and the lower convex element 114 have spherical curvatures, providing at least two degrees of freedom to the upper concave element 112. The bearing elements 112, 114 may be made of materials suitable for sliding movement and capable of reacting large forces, particularly certain metals, ceramics, and plastics, such as steel and nylon.

The seal 118 is disposed on top of the upper concave element 112 to help prevent debris and other foreign objects from contaminating the interface between the lower convex element 114 and the upper concave element 112. The upper surface of the seal 118 may be used to interface with the extension 104, as further described below, and as such may be considered a critical surface for ensuring proper interfacing between the support 102 and the extension 104. The position of this upper surface may be adjusted during calibration to achieve proper interfacing by using shims or other means to elevate the entire bearing assembly 110. The seal 118 may be any of a number of resilient materials, including, but not limited to, metals, rubbers, and plastics. The seal retainer 120 may be placed around the seal 118 to affix the seal 118 to the upper concave element 112, such as by holding a wall of the seal 118 in a groove of the upper concave element 112. The bearing retainer 122 may be placed over the other components to fix the position of the bearing assembly 110 within the recess 116. The bearing retainer 122 also helps to prevent foreign matter from entering the recess 116. The retainers 120, 122 may be any of a number of resilient materials, including, but not limited to metals, rubbers, and plastics.

Figure 2B:
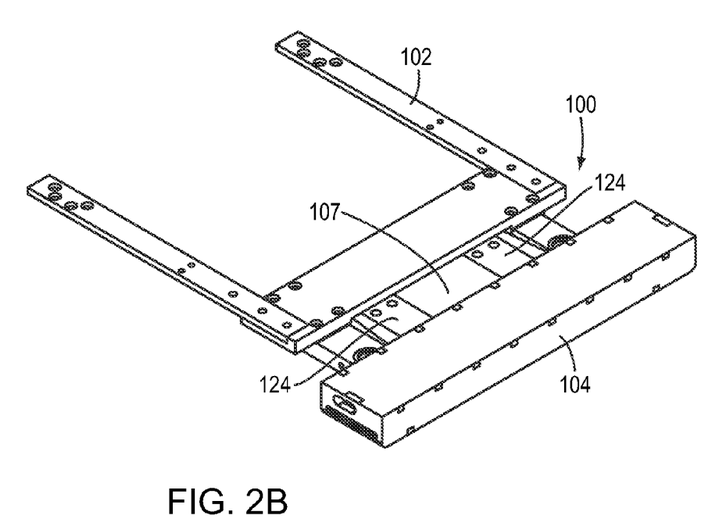

The extension 104 depicted in FIG. 1 has an extension tenon 107 extending beyond an extension mating surface 109 where the extension 104 contacts the support 102 by approximately 80 mm. The extension tenon 107 may extend beyond the extension mating surface 109 by as little as 50 mm or less, or by as much as 90 mm or more. The extension tenon 107 also has load plates 124 disposed on an upper surface thereof. The load plates 124 are positioned to be aligned with the bearings 110 on the underside of the support 102 when the support 102 and the extension 104 are coupled. FIGS. 2A and 2B depict horizontal alignment of the load plates 124 and the bearings 110 when the support 102 and the extension 104 are partially coupled. The load plates 124 may extend beyond the upper surface of the extension tenon 107 by approximately 0.5 mm, and may be as little as 0.2 mm or less, and as much as 1.0 mm and more, to help ensure that most of the loads are reacted through the interface between the load plates 124 and the bearings 110. Additional load plates 124 may be disposed on an underside of the extension 106, as depicted in FIG. 2A. The load plates 124 may be made of a material sufficient to react large forces without compressing, cracking, or otherwise falling out of tolerance. Such materials may include, but are not limited to, certain metals, ceramics, and plastics, particularly hardened and tempered metals. The extension 104 may frequently be cantilevered from the support 102, so lightweight materials may be desirable, such as carbon fiber. However, depending on the interface 100 and other requirements, heavier materials may be used, such as metals (e.g., aluminum, steel), ceramics and plastics.

Figure 5A:
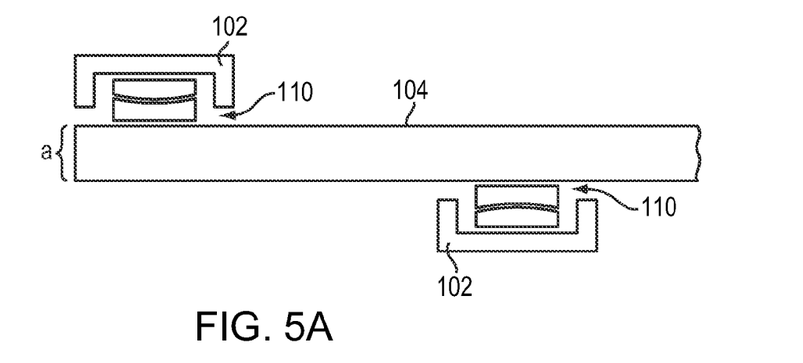
FIG. 5A is a schematic diagram depicting the interface of FIG. 1 when the support and the extension are coupled in accordance with one embodiment of the invention.
Figure 5B:
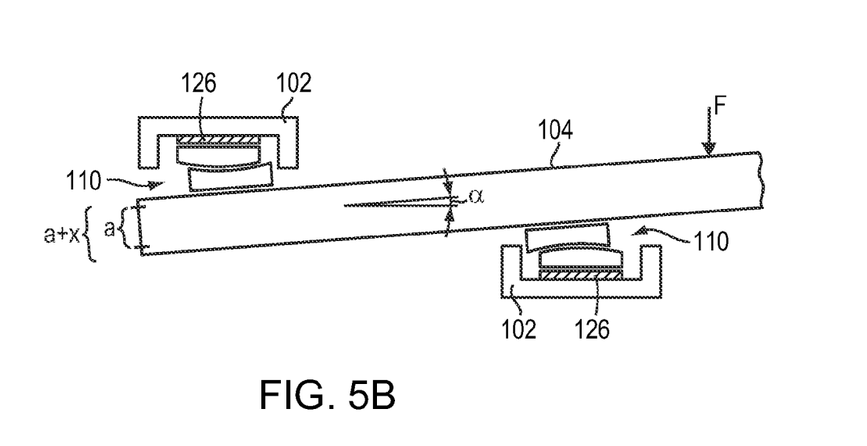
FIG. 5B is a schematic diagram depicting a modified interface to couple the extension at an angle relative to the support in accordance with another embodiment of the invention.

FIGS. 5A and 5B schematically depict the coupling of the extension 104 to the support 102. FIGS. 5A and 5B are simplified to more clearly illustrate the principles of the invention by removing extraneous structure and depicting the interface between the extension 104 (depicted as a generic rectangle) and the bearings 110 connected to the support 102. The extension tenon 107 is aligned with the slot formed between the support tenons 106. The extension tenon 107 may be aligned with the slot at an angle and then allowed to settle into an equilibrium position. In some embodiments, the extension tenon 107 will settle into a substantially horizontal position, as depicted in FIG. 5A, and the bearings 110 will similarly self-level to a horizontal position. In other embodiments, it may be desirable to have the extension 104 inclined at an angle $\alpha$. This may be achieved by altering any of a number of dimensions, such as using a thicker extension 104 (e.g., one having a thickness of "a+x" instead of "a") and/or adding spacers 126 beneath one or more of the bearings 110. Though the top surfaces of the bearings 110 will not be horizontal, they will reach an equilibrium loading state where loads (e.g., applied forces, such as gravity, represented by "F") are equally distributed amongst the bearings 110. This distributed loading profile, combined with the relatively large contact surface between the load plates 124 and the bearings 110, helps reduce the wear and tear experienced by the components.

There are several advantages to using the bearings 110 and the load plates 124 for the interface 100. The critical dimensions for fit are the positioning of top surfaces of the bearings 110 and load plates 124, as opposed to entire faces of the support 102 and the extension 104. Tolerances on the bearings 110 and the load plates 124 may be more easily controlled than on the faces. In some embodiments, the bearings 110 may all be located on the support 102. Because the bearings 110 may be more expensive than the load plates 124, this can result in significant cost savings by not having to include bearings 110 on each extension 104. All of the load plates 124 for a given interface 100 may be disposed on the extension 104, again helping to facilitate the cheaper manufacture of multiple extension modules 104. However, it may be desirable to have the load plates 124 on the support 102 and the bearings 110 on the extension 104, or some combination thereof, in certain other embodiments. Additionally, the simple relative vertical displacements of the bearings 110 via spacers 126 or other means may create a desirable gradient in the displacement of the extension 104, while still maintaining a relatively large contact surface within the bearing 110 to react forces. In some embodiments, where all points of contact between the support 102 and the extension 104 are through the bearings 110 and load plates 124, because the bearings 110 are self-leveling, the load may be spread evenly across the bearings 110.

Figure 6A:
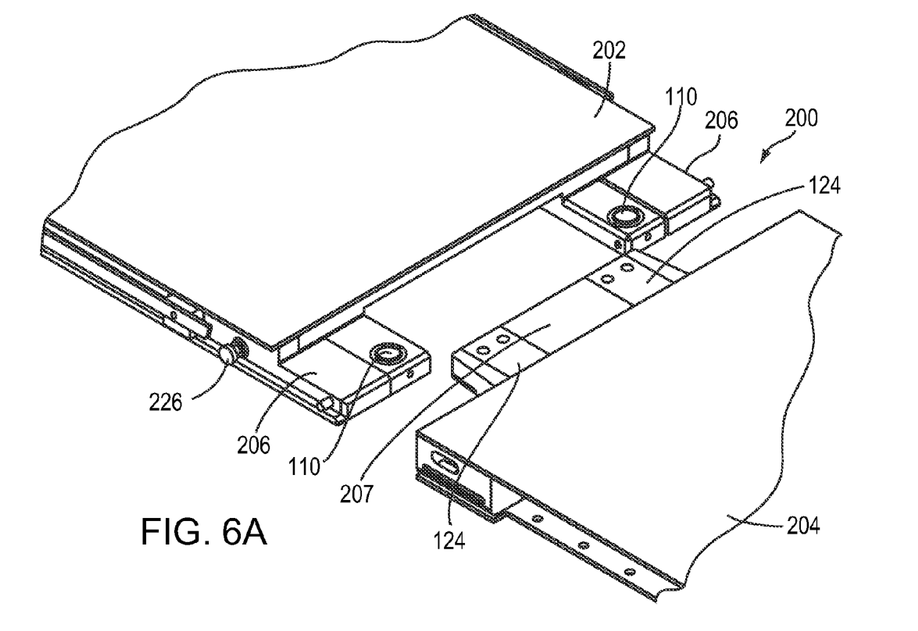
FIGS. 6A and 6B are schematic perspective top views of a support and an extension in uncoupled and partially coupled positions, respectively, in accordance with another embodiment of the invention.
Figure 6B:
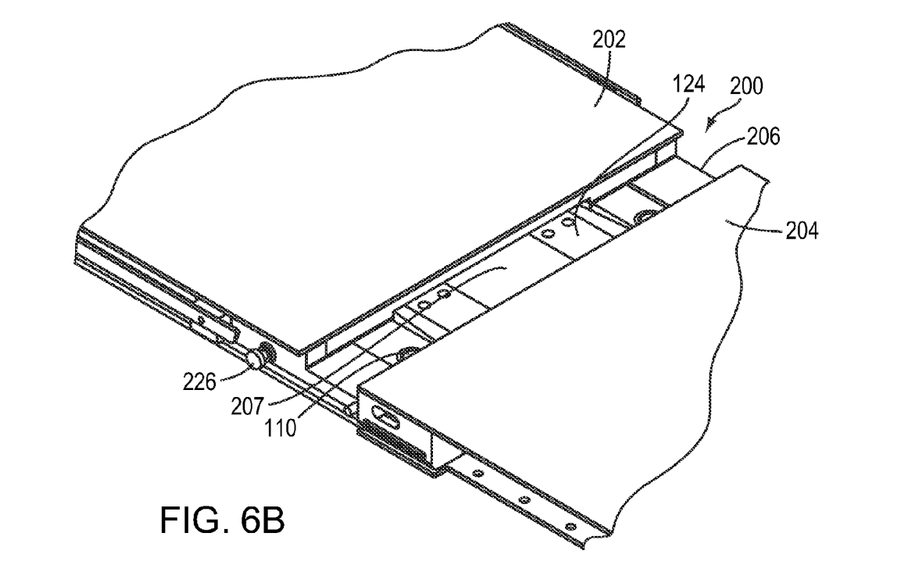

FIGS. 6A and 6B depict a releasable coupling interface 200 of another embodiment of a support 202 and an extension 204. The support 202 has a top surface for supporting a specimen, such as a human body. This surface may be made of any of a number of materials, including plastics, metals, and carbon fiber. In one embodiment, the support surface is made of aluminum. The support 202 may also include a release handle 226. The release handle 226 may be coupled to a latch configured for engaging the extension 204 for retaining the extension 204 in the coupled position. To release the extension 204, a user may pull the release handle 226 to disengage the latch, thereby allowing the extension 204 to be uncoupled from the support 202. A biasing member, such as a spring or other resilient member, may be provided to displace the extension 204 relative to the support 202. Additionally, when the support 202 and the extension 204 are coupled, a visual indicator may be visible to indicate proper coupling. The visual indicator may be a marking on the support 202 that is visible through a port on the extension 204, a light that is illuminated when the tenons are fully interdigitated, or other visual indicators.

The extension 204 also has a top surface for supporting a specimen. This surface may be made of many materials, including those that may be used with the top surface of the support 202. Given the often cantilevered configuration of the extension 204, lighter weight materials such as carbon fiber may be used. The surface of the extension 204 may be square, rectangular, irregular shaped, or any other shape configured for supporting a specimen.

Figure 7A:
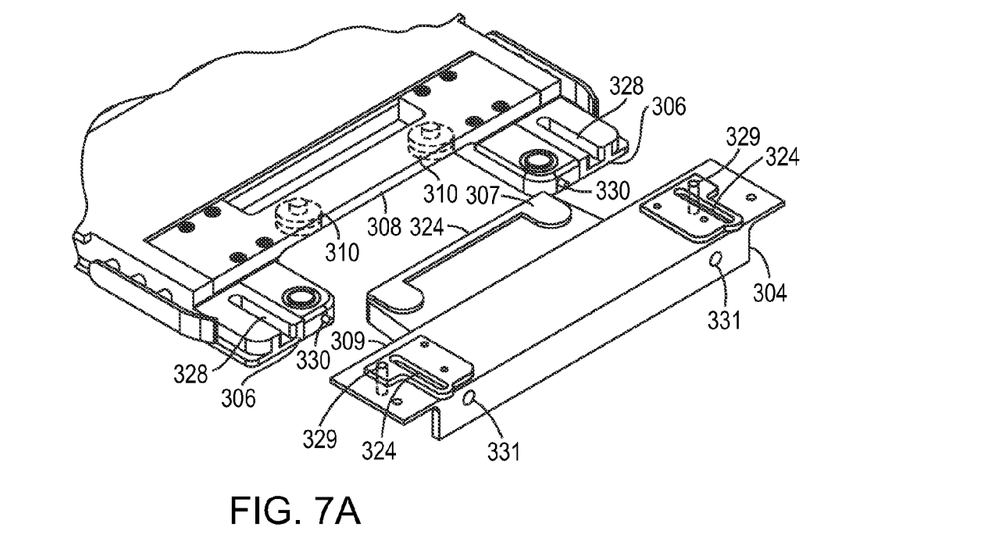
FIGS. 7A and 7B are schematic perspective top and bottom views, respectively, of interfacing elements of a support and an extension in an uncoupled position in accordance with a further embodiment of the invention.
Figure 7B:
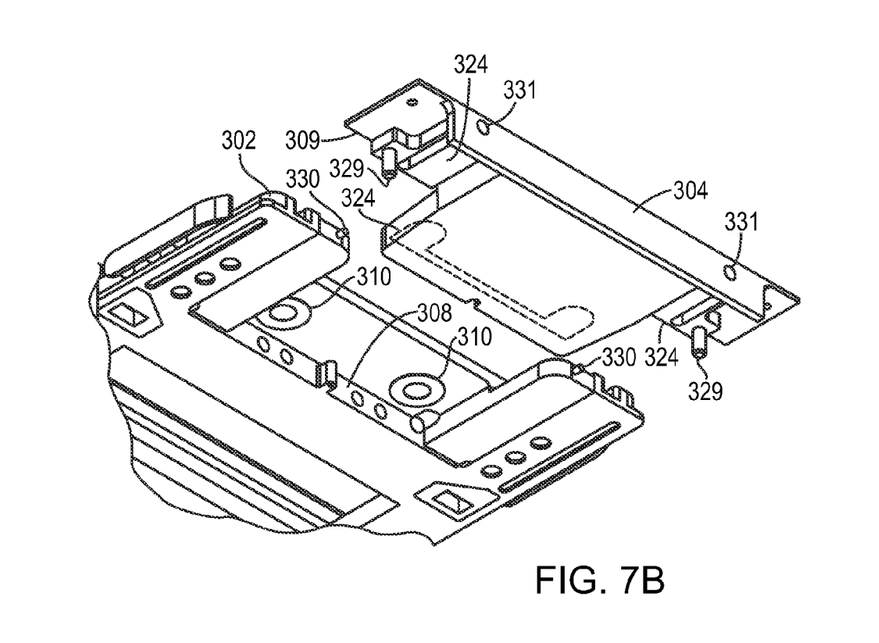
Figure 7C:
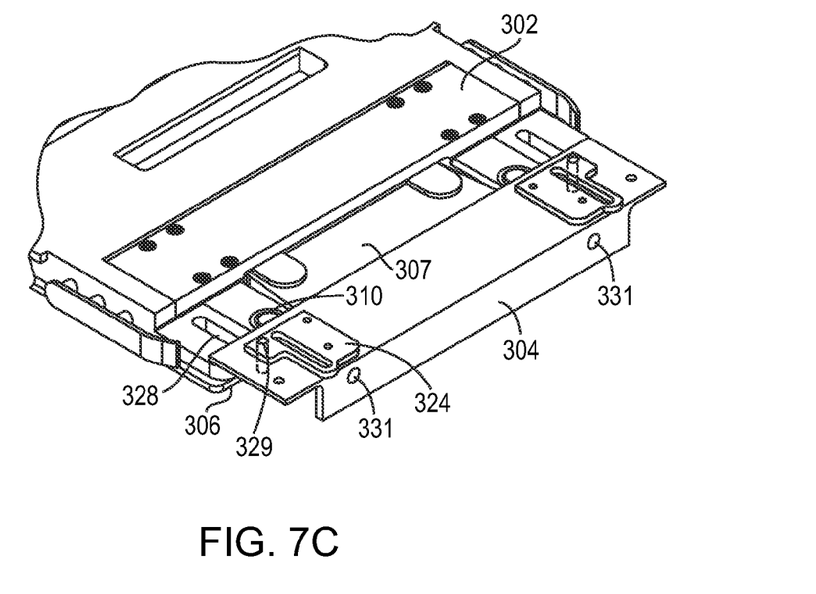
FIG. 7C is a schematic top perspective view of the elements of FIGS. 7A and 7B in a partially coupled position in accordance with one embodiment of the invention.

FIGS. 7A to 7C depict a releasable coupling interface 300 of another embodiment of a support 302 and an extension 304. Several of the components may be similar to those of previously described releasable coupling interfaces 100, 200. For example, a support 302, includes two support tenons 306 extending beyond a support mating edge 308. Each support tenon 306 may contain a bearing 310 as before, and may also include a channel 328 sized to receive a mating feature 329 (e.g., a pin) on the extension 304. The mating feature 329 may be restrained within the channel 328 by a latching mechanism, which is described in greater detail below. Additional protrusions 330 may extend from the support tenons 306. These protrusions 330 may be configured to mate with a complementary receiving feature 331 on the extension 304. The interface between the protrusions 330 and the receiving features 331 may provide additional support or help in ensuring the support 302 and the extension 304 are properly disposed relative to each other when coupled.

The extension 304 includes an extension tenon 307 extending beyond an extension mating surface 309. The extension 304 may also include load plates 324 configured to mate with the bearings 310, pins 329, and receiving features 331. The pins 329 may be disposed proximate the load plates 324 on a lower side of the extension 304 to be received within the channels 328. The extension 304 may also have receiving features 331 to engage with the protrusions 330. FIG. 7C depicts the extension 304 in partial contact with the support 302. The lateral positioning of the various elements can be seen, such as the channels 328 relative to the pins 329, the bearings 310 relative to the load plates 324, the slot relative to the extension tenon 307, and the protrusions 330 relative to the receiving features 331. These feature pairings, alone or in combination, help to ensure accurate positioning of the support 302 and the extension 304.

Figure 8A:
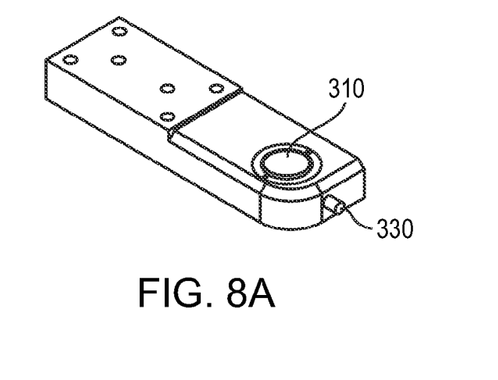
FIGS. 8A and 8B are, respectively, enlarged schematic and exploded perspective views of a portion of a tenon and a bearing on the support of FIGS. 7A-7C in accordance with one embodiment of the invention.
Figure 8B:
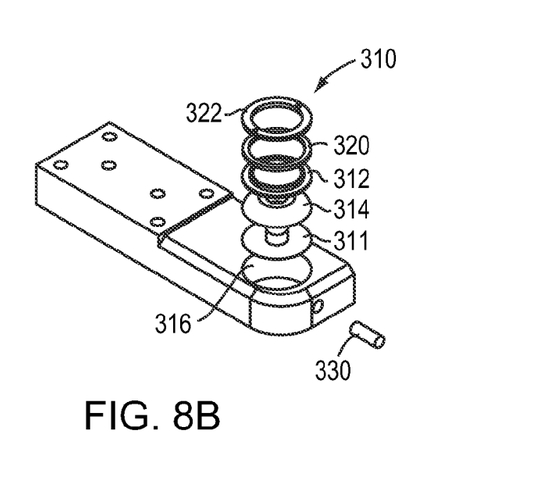

FIGS. 8A and 8B depict the bearing assembly 310 and surrounding area in an enlarged and exploded view, respectively. The bearing assembly 310 functions in substantially the same way as the bearing assembly 110. Many of the elements are similar in form and function to their previously described counterparts, including retainers 320, 322. The bearing assembly 310 may still rely on interfacing curved surfaces for movement, though a lower convex element 314 may be located on a support 311, as opposed to directly on a bottom of a recess 316. Also, an upper concave element 312 may have a concave curvature on a lower surface for interfacing with the lower convex element 314 and a substantially flat upper surface for interfacing with the load plates 324. This upper concave element 312 may also help seal the lower convex element 314 from the environment outside of the recess 316.

Figure 9A:
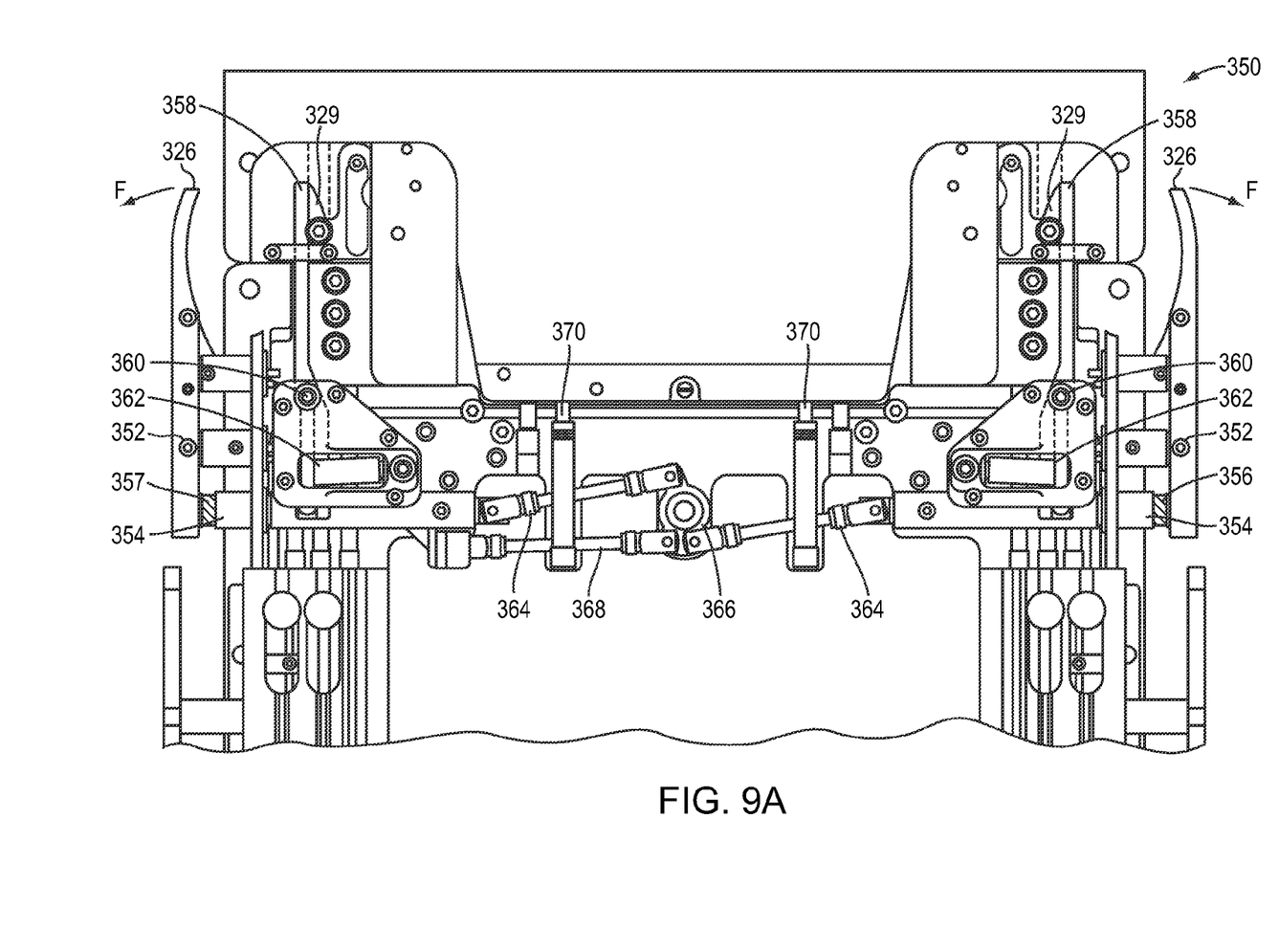
FIG. 9A is a schematic plan view of a latching mechanism for use with the support and the extension of FIGS. 7A-7C in accordance with one embodiment of the invention.
Figure 9B:
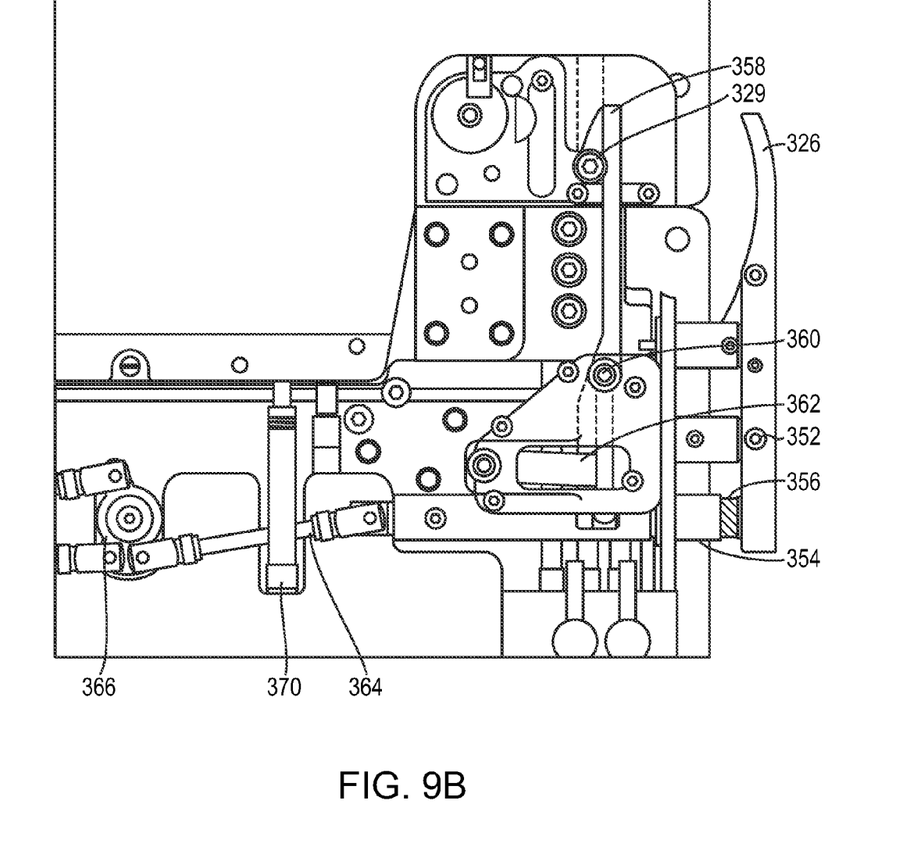
FIG. 9B is an enlarged schematic view of a portion of the latching mechanism of FIG. 9A in accordance with one embodiment of the invention.

FIGS. 9A and 9B depict a latching mechanism 350 for the releasable coupling interface 300. The latching mechanism 350 includes release handles 326, handle pivots 352, sleeves 354, sliders 356, latches 358, latch pivots 360, latch biasing element 362, slider links 364, a rotary element 366, and a rotary biasing element 368. The components may be depicted out of position to allow all features to be seen simultaneously. The handles 326 may be substantially rigid and comprise an elongate portion adapted to be pulled outwardly from the support 302. The handles 326 may pivot about the handle pivots 352.

Figure 10A:
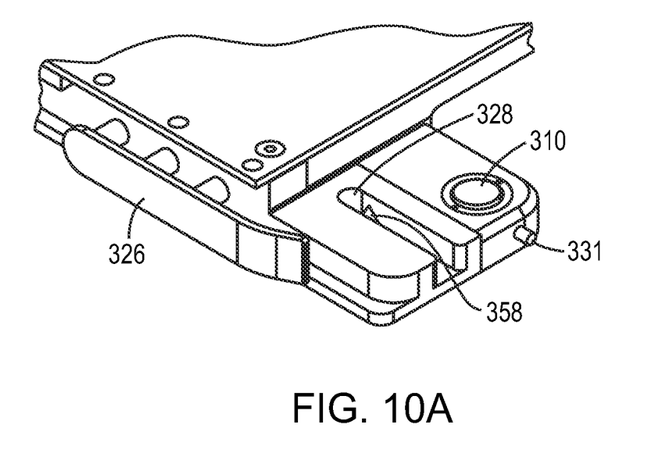
FIGS. 10A and 10B are expanded schematic perspective views of a tenon of the support of FIGS. 7A-7C in accordance with one embodiment of the invention.
Figure 10B:
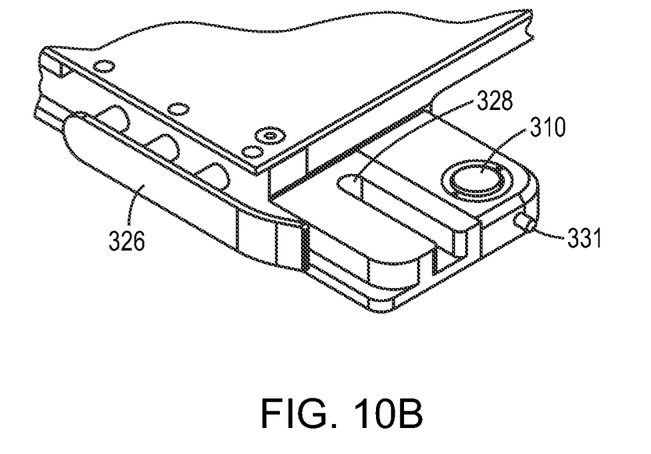

The sleeves 354 may be located on an underside of the support 302, with one end of the sleeves 354 proximate a distal end of the handle 326. The sleeves 354 are configured to house the sliders 356 in slidable contact. Each slider 356 may have a notch along a length thereof for receiving a proximal end of the latch 358. The latch 358 rotates about the latch pivot 360. A distal end of the latch 358 may have a feature, e.g., a hook, to retain the pin 329. The latch 358 may be configured such that the hook extends into the channel 328 when in a first position (see FIG. 10A), and does not extend substantially into the channel 328 when in a second position (see FIG. 10B). The latch biasing element 362 may bias the latch 358 toward one of the positions, e.g., the first position, thereby helping to retain the pin 329 (and therefore the extension 304), when the extension 304 and the support 302 are fully meshed. The latch biasing element 362 may be a resilient element such as a spring.

An end of the slider 356 proximate the handle 326 may have a distinctive color, e.g., green, to serve as a visual indicator to a user regarding positioning of the latch 358. The slider 356 may be configured to cover an indicating element 357 on the handle 326. The indicating element 357 may be differently colored from the end of the slider 356, e.g., red, to indicate the latch 358 is in a different position than when the slider 356 is visible. For example, the slider 356 may be visible when the latch 358 is in the channel 328 to retain the pin 329, allowing the user to quickly determine that coupling is complete when they see green. However, if the latch 358 is not in the channel 328, the user may see red on the indicating element 357 and immediately understand that coupling is not complete and that the extension 304 is not ready for use.

An end of the slider 356 opposite the handle 326 may be coupled to the slider link 364, such that movement of the slider 356 moves the slider link 364 and vice-versa. The link 364 may be coupled to the rotary element 366, such that linear movement of the link 364 causes rotation of the rotary element 366 and rotation of the rotary element 366 causes linear motion of the link 364. The other link 364 may be coupled to an opposite side of the rotary element 366. In this configuration, the links 364 work in unison, either pulling each link 364 away from its respective sleeve 354, or pushing each link 364 toward its respective sleeve 354. The rotary biasing element 368 may urge the rotary element 366 in a particular direction, e.g., a counter-clockwise direction. This helps keep each link 364 (and thus the associated slider 356), biased toward each latch 326, unless a sufficient opposing force is applied.

Figure 11:
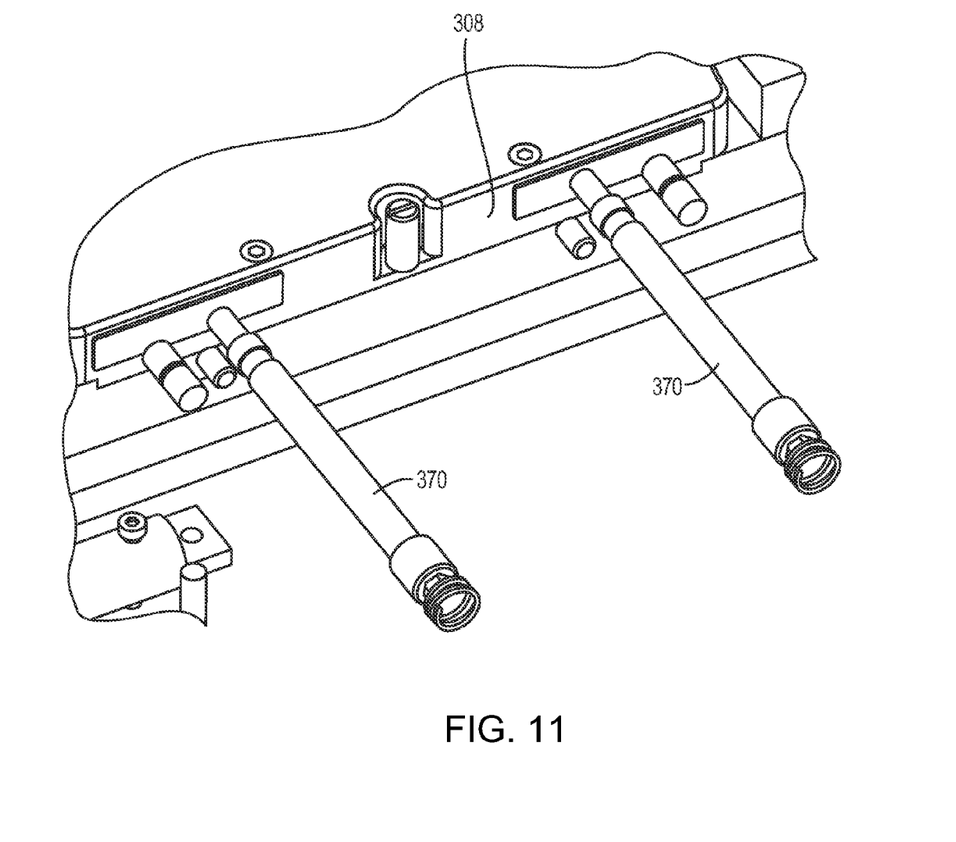
FIG. 11 is an expanded schematic perspective view of a mating edge of the support of FIGS. 7A-7C with ejectors in accordance with one embodiment of the invention.

As depicted in FIG. 11, the releasable coupling interface 300 may also include ejectors (or biasing members) 370. These ejectors 370 may be disposed proximate the support mating edge 308, and may typically extend beyond the support mating edge 308 into a slot between the tenons 306, although typically not beyond the tenons 307. The ejectors 370 may be resilient elements, such as springs, that are compressed when the support 302 and the extension 304 are coupled, providing a biasing force against the extension 304 away from the support 302 that may be counteracted, e.g., by the latch 358 on the pin 329. The ejectors 370 may also be mounted on the extension 304.

Figure 12A:
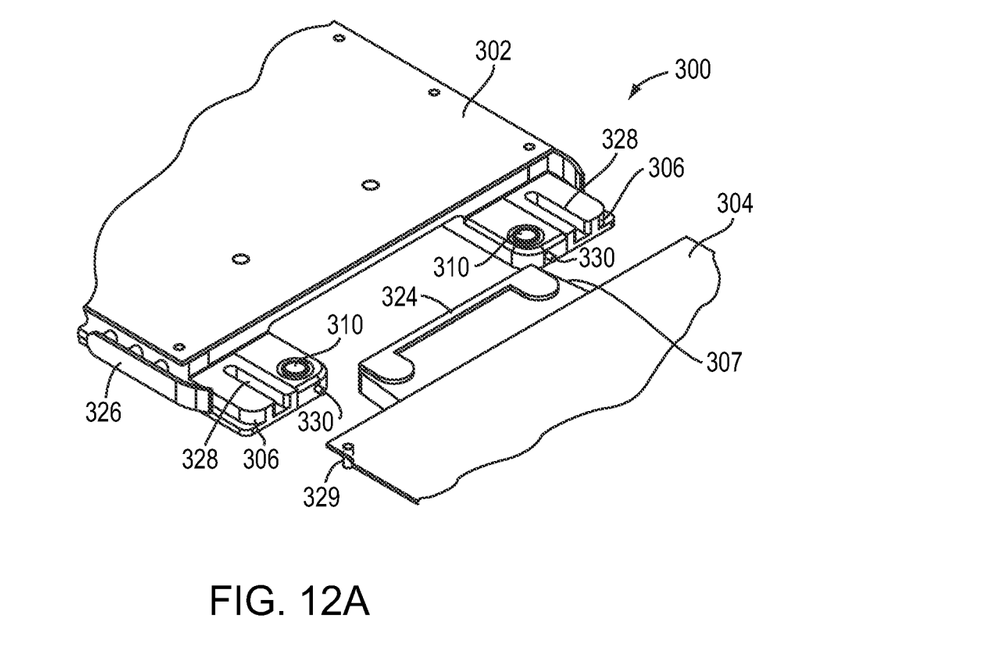
FIGS. 12A and 12B are schematic perspective views of the support and the extension of FIGS. 7A-7C with top surfaces in uncoupled and partially coupled positions, respectively, in accordance with one embodiment of the invention.

The releasable coupling interface 300 may operate similarly to the previously described releasable coupling interfaces 100, 200 in many ways. For example, as depicted in FIG. 12A, the support 302 and the extension 304 may be positioned such that the slot between the support tenons 306 and the extension tenon 307 are aligned. Additional features also may be aligned, including the channels 328 and the pins 329, along with the protrusions 330 and the receiving features 331. The bearings 310 and the load plates 324 come into contact as the support 302 and the extension begin to be coupled. Additionally, the pins 329 force the distal end of the latch 358 out of the channel 328. This movement of the latch 358 should overcome bias force provided by the latch biasing element 362, thereby compressing the latch biasing element 362 and causing the slider 356 to move within the sleeve 354 away from the latch 326. Movement of the slider 356 may uncover the indicating element 357 on the latch 326, indicating to a user that the latch 358 is not in a locking position. The slider link 364 moves in substantially the same direction as the slider 356, causing rotation of the rotary element 366 and compressing the rotary biasing element 368. When both latches 358 are contacted simultaneously, these actions may occur substantially simultaneously on both sides of the latching mechanism 350.

Figure 12B:
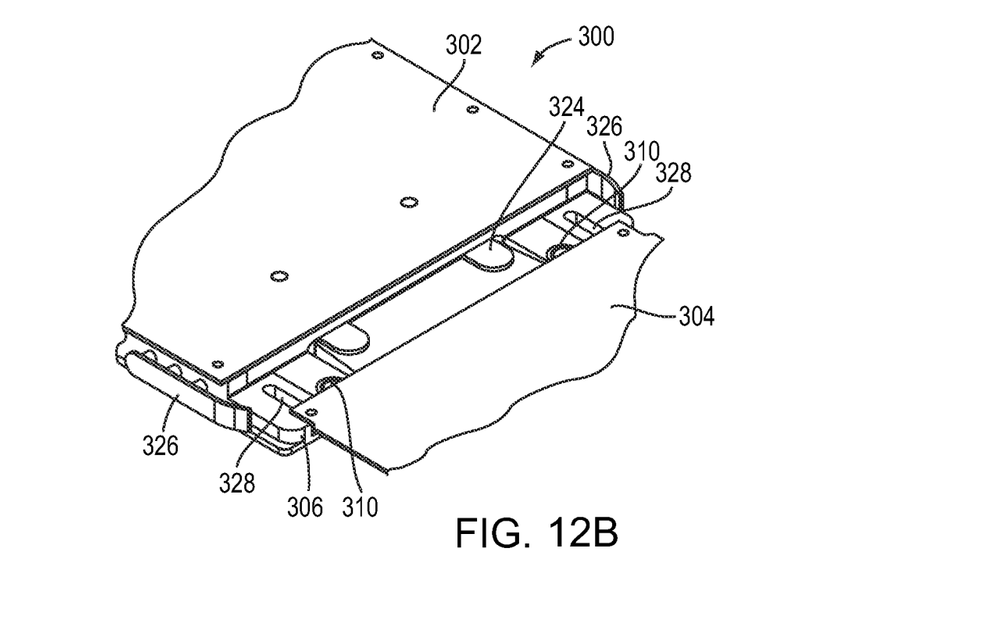

As the support mating edge 308 and the extension mating surface 309 come into contact, the extension mating surface 309 compresses the ejectors 370 and the pins 329 move past the distal ends of the latches 358. The latch biasing elements 362 may force the distal ends of the latches 358 into the channels 328, locking the pins 329 (and therefore the extension 304) in a secure, coupled position relative to the support 302. This movement of the latches 358 causes the proximal end of the latches 358 to force the sliders 356 toward the handles 328, covering the indicating elements 357 and allowing the user to easily determine that the extension 304 is secure in its releasable coupling to the support 302. In this secure position, the extension 304 self-levels on the self-leveling bearings 310, helping distribute any loads evenly across the bearings 310. The protrusions 330 and the receiving elements 331 may also be fully enmeshed.

To release the extension 304, the user applies a force F (depicted in FIGS. 9A and 9B) to one or both of the handles 328. The handle 328 forces the slider 356 further into the sleeve 354, moving the proximal end of the latch 358 in the slider notch inward. The latching mechanism 350 operates in the same manner as described above during installation, except the latch 358 is moved from the proximate end as opposed to the distal end. When the latches 358 clear the pins 329, the force from the ejectors 370 moves the pins 329 beyond the hook feature on the latches 358 (preventing the pins 329 from being inadvertently locked in place again), but not so far as to cause the extension 302 to fall off the support 304. From this detached position, the extension 304 may be manually removed.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The compositions, components, and functions can be combined in various combinations and permutations, to achieve a desired result. For example, all materials for components (including materials not necessarily previously described) that are suitable for the application are considered within the scope of the invention. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. An apparatus for supporting a patient, comprising:
   a support comprising first and second tenons, and an extension comprising at least a third tenon, wherein the first and second tenons extend beyond respective mating edges of the support to form at least one slot therebetween, the slot sized and configured to receive the third tenon when the extension and the support are substantially aligned;
   a plurality of load plates disposed on either an upper or lower surface of the support extension and configured to distribute a load; and
   a plurality of bearings disposed on either an upper or lower surface of the support and proximate to the slot;
   wherein a first one of the plurality of bearings is disposed on the first tenon, and wherein a second one of the plurality of bearings is disposed on the second tenon; and
   wherein each bearin is aligned to mate with a respective one of the plurality of load plates when the extension and the support are coupled to form an interface, each bearing has a curved surface that allows at least one degree of freedom when a load is applied to the extension, and at least a portion of each bearing moves relative to the corresponding load plate to distribute the load.

2. The apparatus of claim 1, wherein the first and second tenons are disposed proximate opposite edges of the support.

3. The apparatus of claim 1, wherein all of the bearings are disposed on the support.

4. The apparatus of claim 1, wherein the bearings comprise at least two degrees of freedom.

5. The apparatus of claim 1, wherein the bearings comprise self-leveling surfaces.

6. The apparatus of claim 1, wherein the interface comprises four bearings.

7. The apparatus of claim 1, wherein the support comprises aluminum.

8. The apparatus of claim 1, wherein the extension comprises carbon fiber.

9. The apparatus of claim 1, wherein the one degree of freedom comprises a rotational degree of freedom.

10. The apparatus of claim 1, wherein all the load plates are disposed on the extension.

11. The apparatus of claim 1, further comprising a latch for securing the extension and the support.

12. The apparatus of claim 1, further comprising at least one biasing member for displacing the extension relative to the support.

13. The apparatus of claim 1, further comprising a visual indicator of proper coupling of the support and the extension.

* * * * *

UNITED STATES PATENT AND TRADEMARK OFFICE
CERTIFICATE OF CORRECTION

| | | |
|---|---|---|
| PATENT NO. | : 9,121,421 B2 | Page 1 of 1 |
| APPLICATION NO. | : 13/303595 | |
| DATED | : September 1, 2015 | |
| INVENTOR(S) | : Dietmar Huggler et al. | |

It is certified that error appears in the above-identified patent and that said Letters Patent is hereby corrected as shown below:

IN THE CLAIMS
Claim 1, Col. 10, Line 24, "bearin" should read as --bearing--.

Signed and Sealed this
Twelfth Day of January, 2016

Michelle K. Lee
*Director of the United States Patent and Trademark Office*